Feb. 10, 1931.  W. H. GREENE  1,792,371
GUIDE ATTACHMENT FOR FISHING REELS
Filed July 23, 1928

W. H. Greene, Inventor

Patented Feb. 10, 1931

1,792,371

UNITED STATES PATENT OFFICE

WILLIAM H. GREENE, OF LONG BEACH, CALIFORNIA

GUIDE ATTACHMENT FOR FISHING REELS

Application filed July 23, 1928. Serial No. 294,616.

This invention relates to a guide attachment for lines used in connection with fishing reels, one of the objects being to provide an efficient and simple device which can be actuated readily by the thumb or finger of the hand holding the fishing rod so as to feed the line properly on to the reel as it is being wound.

Another object is to provide an attachment of this character which can be used in connection with the ordinary reels, it being unnecessary to employ any special construction for the purpose of holding the attachment in place.

With the foregoing and other objects in view which will appear as the description proceeds the invention resides in the combination and arrangement of parts and in the details of construction hereinafter described and claimed it being understood that changes in the precise embodiment of the invention may be made within the scope of what is claimed without departing from the spirit of the invention.

In the accompanying drawings the preferred form of the invention has been shown.

In said drawings.

Figure 1:
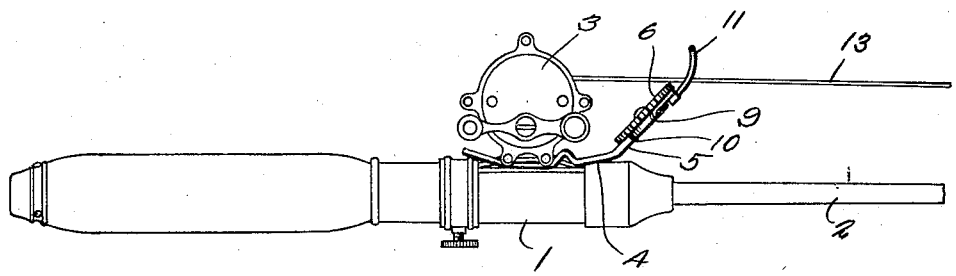
Figure 1 is a side elevation of the handle of a fishing rod and the reel thereon, there being a guide attachment combined therewith.
Figure 2:
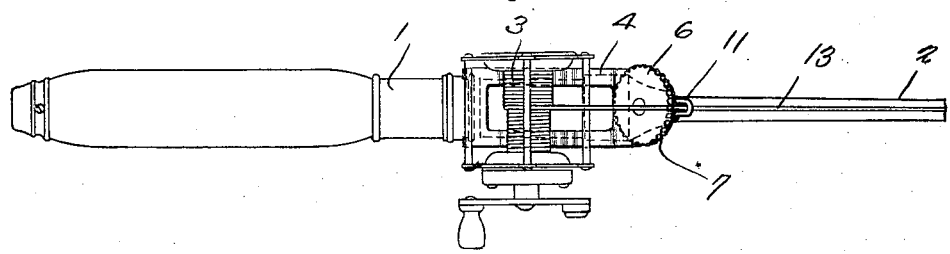
Figure 2 is a plan view of the structure shown in Figure 1.
Figure 3:
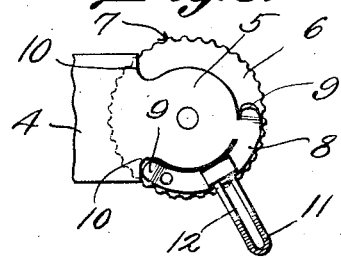
Figure 3 is an enlarged bottom plan view of the attachment, a portion of its bracket being broken away.

Referring to the figures by characters of reference 1 designates the usual handle of a fishing pole 2, there being a reel 3 mounted on the handle and held thereto in the usual way. The attachment constituting the present invention includes a base plate 4 adapted to be inserted between the handle 1 and the reel 3 so as to clamp the plate by the pressure of the reel frame thereagainst. If preferred, however, this attaching plate can be made integral with the frame of the reel. One end of the plate 4 has a tongue 5 extending therefrom at an obtuse angle and mounted for rotation on this tongue is a wheel 6 having a milled or toothed edge shown at 7, this edge projecting beyond the adjacent edges of the tongue 5 at both sides and at the free end of the tongue.

Secured to the bottom of wheel 6 adjacent the periphery thereof is an arcuate strip 8 provided with downturned terminals 9 constituting stop ears adapted to come against shoulders 10 formed at the sides of the tongue 5. Thus the rotation of the wheel is limited in both directions. Extending from the arcuate strip 8 is a finger 11 having a longitudinal slot 12 closed at its end. The fishing line 13 extending from the reel 3 is adapted to extend through this slot.

While reeling in the line the thumb of the hand holding the handle 1 can be pressed against the edge of the wheel 6 and said wheel can be rotated back and forth. This will cause the slotted finger 11 to feed the line properly to the reel as it is wound thereon with the result that the line will be wound evenly and will not become entangled. Wheel 6 can be rotated slowly in one direction until stopped by the cooperation of one of the ears 9 with one of the shoulders 10. It can then be rotated slowly in the opposite direction until again stopped.

The device is very simple and efficient and will be found of considerable utility when used as described.

What is claimed is:

1. The combination with a fishing reel and a handle to which the reel is connected, of a base plate extending from the base of the reel and bearing on the handle, a tongue inclined relative to the base and integral therewith, said tongue extending in front of and being spaced from the reel, a wheel mounted for rotation on the tongue and having opposed portions projecting therebeyond for engagement and actuation by a finger of the hand grasping the handle, and a longitudinally slotted finger connected to and movable with the wheel for guiding a fishing line, said finger being mounted to swing laterally relative to the inclined tongue.

2. The combination with a fishing reel and a handle to which the reel is connected, of a base plate extending from the base of the reel and bearing on the handle, a tongue inclined relative to the base and integral therewith, said tongue extending in front of and being spaced from the reel, a wheel mounted for rotation on the tongue and having opposed portions projecting therebeyond for engagement and actuation by a finger of the hand grasping the handle, a strip secured to the wheel and having terminal stop ears movable against the respective sides of the tongue to limit the rotation of the wheel and a slotted finger extending from and movable with the wheel, said finger constituting a guide for a fishing line.

In testimony that I claim the foregoing as my own, I have hereto affixed my signature.

WILLIAM H. GREENE.